US012620145B2

(12) United States Patent
Ebelin et al.

(10) Patent No.: US 12,620,145 B2
(45) Date of Patent: May 5, 2026

(54) LUMINANCE-PRESERVING AND TEMPORALLY STABLE DALTONIZATION

(71) Applicant: NVIDIA Corporation, Santa Clara, CA (US)

(72) Inventors: Johan Pontus Ebelin, Skåne (SE);
Cyril Crassin, Courbevoie (FR);
Tomas Guy Akenine-Möller, Lund (SE)

(73) Assignee: NVIDIA Corporation, Santa Clara, CA (US)

( * ) Notice: Subject to any disclaimer, the term of this patent is extended or adjusted under 35 U.S.C. 154(b) by 112 days.

(21) Appl. No.: 18/491,993

(22) Filed: Oct. 23, 2023

(65) Prior Publication Data

US 2024/0193825 A1 Jun. 13, 2024

Related U.S. Application Data

(60) Provisional application No. 63/520,482, filed on Aug. 18, 2023, provisional application No. 63/431,585, filed on Dec. 9, 2022.

(51) Int. Cl.
G06T 11/10 (2026.01)
G06T 7/90 (2017.01)

(52) U.S. Cl.
CPC .............. G06T 11/10 (2026.01); G06T 7/90 (2017.01); G06T 2207/10016 (2013.01);
(Continued)

(58) Field of Classification Search
CPC .................... G06T 11/001; G06T 7/90; G06T 2207/10016; G06T 2207/10024;
(Continued)

(56) References Cited

U.S. PATENT DOCUMENTS 8,792,138 B2 * 7/2014 Boggs .................. G09B 21/008
358/530
11,361,476 B2 * 6/2022 Young ........................ G06T 1/20
(Continued)

FOREIGN PATENT DOCUMENTS

JP WO 02/48960 * 6/2002 ............. G06T 17/00

OTHER PUBLICATIONS

Iaccarino, G., Malandrino, D., Percio, M., Scarano, V., Efficient Edge-Services for Colorblind Users, World Wide Web Conference, May 2006, pp. 919-920. (Year: 2006).*

*Primary Examiner* — Said Broome
(74) *Attorney, Agent, or Firm* — Leydig, Voit & Mayer, Ltd.

(57) ABSTRACT

It is difficult for people with color vision deficiency (CVD) to distinguish between certain colors, e.g., reds and greens may be indistinguishable, causing a loss of information. Image recoloring, daltonization, techniques aim to improve the experience for people with CVD. Preserving luminance between the original image as seen by a person with normal color vision and someone with a CVD assists in preserving image appearance. Conventional algorithms attempt to daltonize images by exploiting the content of the image itself. While this is a suitable idea for an image in isolation, temporal inconsistencies (e.g., flickering) occur when applied to a stream of images, as a color c could be mapped to a color a in one frame and b in another. In contrast, the luminance-preserving technique operates on pixels and provides a consistent mapping and therefore is temporally stable.

20 Claims, 15 Drawing Sheets

(52) U.S. Cl.
CPC ............... *G06T 2207/10024* (2013.01); *G06T 2207/20021* (2013.01); *G06T 2207/20081* (2013.01); *G06T 2207/20084* (2013.01)

(58) Field of Classification Search
CPC . G06T 2207/20021; G06T 2207/20081; G06T 2207/20084
See application file for complete search history.

(56) References Cited

U.S. PATENT DOCUMENTS

2010/0321400 A1* 12/2010 Miyahara ............... G09G 5/028
                                                        345/600
2022/0084260 A1* 3/2022 Young .................. G09G 3/2003

* cited by examiner

Luminance-
Preserving Space
100

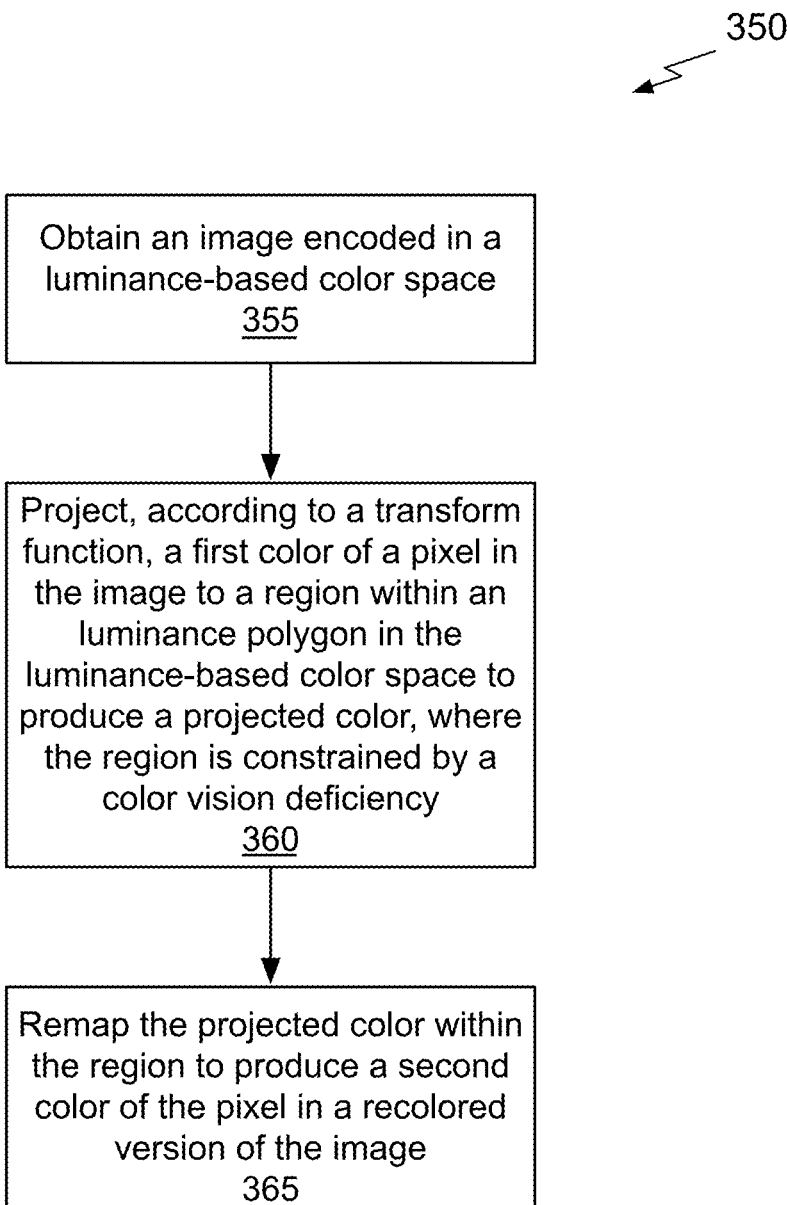

350

Obtain an image encoded in a luminance-based color space
355

Project, according to a transform function, a first color of a pixel in the image to a region within an luminance polygon in the luminance-based color space to produce a projected color, where the region is constrained by a color vision deficiency
360

Remap the projected color within the region to produce a second color of the pixel in a recolored version of the image
365

*Fig. 3B*

LUMINANCE-PRESERVING AND TEMPORALLY STABLE DALTONIZATION

CLAIM OF PRIORITY

This application claims the benefit of U.S. Provisional Application No. 63/431,585 titled "Luminance-Preserving Temporally Stable Method for Improving Images for People with a Color Vision Deficiency," filed Dec. 9, 2022 and U.S. Provisional Application No. 63/520,482 titled "Luminance-Preserving Temporally Stable Method for Improving Images for People with a Color Vision Deficiency," filed Aug. 18, 2023, the entire contents of which are incorporated herein by reference.

BACKGROUND

Color vision deficiencies (CVDs), more commonly known as color blindness, are often caused by genetics and affect the cones on the retina. Approximately 4.5% of the world's population (8% of males) has some form of CVD. There are many different types and severities of CVDs. Because it is hard for people with CVD to distinguish between certain colors, there might be a severe loss of information when presenting them with images as, e.g., reds and greens may be indistinguishable. To that end, several image recoloring, daltonization, techniques have been proposed, which aim to improve the experience for people with CVD. Conventional daltonization techniques do not preserve luminance, are not temporally stable, and/or cannot be executed in real time. There is a need for addressing these issues and/or other issues associated with the prior art.

SUMMARY

Embodiments of the present disclosure relate to luminance-preserving and temporally stable daltonization. Systems and methods are disclosed for a daltonization technique that preserves luminance, is temporally stable, and can be executed in real time. In addition, remapped colors are evenly distributed over the color gamut visible to the person with a CVD, reducing the number of similar colors, thus often improving chrominance contrast.

The most the severe case of CVD, save for monochromacy (only black-white vision) and complete lack of vision, is dichromacy, where an entire class of cone photopigment is missing. For the dichromat, this means that the three-dimensional RGB gamut becomes two dimensional. A dichromat may see only about 0.4% of the 16 million colors displayable with a 24-bit monitor, which makes the task of improving images using daltonization a challenging one. In fact, trying to present the dichromat with the same experience as someone with normal color vision is impossible. Color confusion is unavoidable; however, achromatic acuity is known to be significantly higher than chromatic acuity, a phenomenon that is exploited by chroma subsampling in image compression algorithms. Thus, a good starting point for preserving image appearance is preserving luminance between the original image as seen by a person with normal color vision and someone with a CVD. Conventional algorithms attempt to daltonize images by exploiting the content of the image itself. While this could be a suitable idea for an image in isolation, it often gives rise to temporal inconsistencies (e.g., flickering) when applied to a stream of images (e.g., video), as a color c could be mapped to a color a in one frame and b in another.

In contrast to conventional systems, as described further herein, a luminance-preserving and temporally stable daltonization algorithm is temporally stable, fast, and luminance-preserving. The luminance-preserving and temporally stable daltonization algorithm recolors and presents images in real time.

In an embodiment, the method includes obtaining an image encoded in a luminance-based color space and remapping first colors in the image to produce second colors in a recolored version of the image, wherein the second colors are constrained by a color vision deficiency and luminance values of the second colors and the respective first colors are equal.

In an embodiment, a first color of a pixel in the image is projected, according to a transform function, to a region constrained by a color vision deficiency and within a luminance polygon in the luminance-based color space to produce a projected color and the projected color is remapped within the region to produce a second color of the pixel in a recolored version of the image.

BRIEF DESCRIPTION OF THE DRAWINGS

The present systems and methods for luminance-preserving and temporally stable daltonization are described in detail below with reference to the attached drawing figures, wherein:

FIG. 3B illustrates a flowchart of a method for luminance-preserving and temporally stable daltonization, in accordance with an embodiment.

DETAILED DESCRIPTION

Figure 1A:
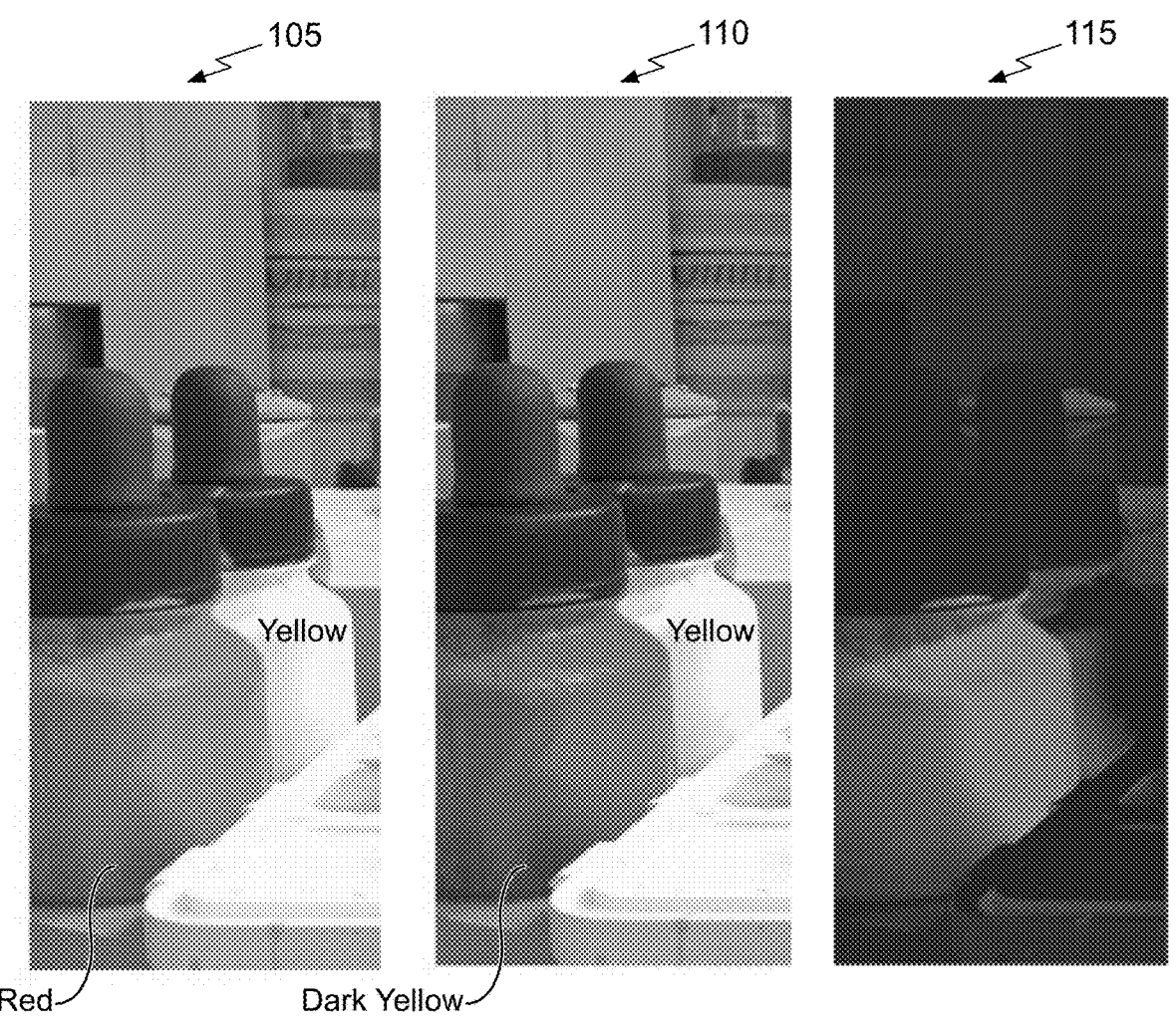
FIG. 1A illustrates an original image and the same image as perceived according to protanopia CVD and an image of relative luminance differences, in accordance with prior art.

Systems and methods are disclosed related to luminance-preserving and temporally stable daltonization. Image recoloring, or daltonization, techniques aim to improve the experience for people with color vision deficiencies (CVDs). About 4.5% of the world population (and 8% of the male population) has some kind of CVD. A person with CVD may see only a fraction of the 16 million colors displayable with a 24-bit monitor, which makes the task of improving images using daltonization challenging. In fact, trying to present the same experience to someone with CVD and someone with normal color vision is impossible. For example, it is difficult for people with CVD to distinguish between certain colors, e.g., reds and greens may be indistinguishable, causing a loss of information.

Color confusion is unavoidable for a dichromat; however, achromatic acuity is known to be significantly higher than chromatic acuity, a phenomenon that is exploited by chroma subsampling in image compression algorithms. Preserving luminance between the original image as seen by a person with normal color vision and someone with a CVD assists in preserving image appearance. Conventional algorithms attempt to daltonize images by exploiting the content of the image itself. While this could be a suitable idea for an image in isolation, temporal inconsistencies (e.g., flickering) occur when applied to a stream of images, as a color c could be mapped to a color a in one frame and b in another. In contrast, the proposed technique provides a consistent mapping and therefore is temporally stable. The luminance-preserving daltonization method operates per pixel.

There are many different types and severities of CVDs. For example, some people have a slightly reduced capability of differentiating red and green while other people perceive both the reds and greens as yellows. Others instead have issues telling the difference between blue and green. Differentiating between the types and severities of CVDs is a crucial aspect to consider when designing algorithms for improving images for people with a CVD.

While a daltonization algorithm should ideally handle each type of CVD, the following description targets the severe case of dichromacy. However, the luminance-preserving and temporally stable daltonization algorithm may be applied to other types and severities of CVD. For the dichromat, the three-dimensional (3D) RGB gamut becomes two dimensional (2D). In the context of the following description, the term CVD simulation refers to the process of simulating what a person with a certain type and severity of CVD experiences when viewing an image. Importantly, people with a CVD are able to perceive achromatic (gray) colors similar to how people without a CVD perceive the achromatic colors, implying that simulations should preserve grays. Focusing on dichromacy, in particular the more common types of protanopia and deuteranopia, a simulation method may be used that was developed for protanopia and deuteranopia as described in VIÉNOT F., BRETTEL H., MOLLON J. D.: Digital Video Colourmaps for Checking the Legibility of Displays by Dichromats. *Color Research & Application* 24, 4 (1999), 243-252. Assuming an input, linearized sRGB color c, and denoting the CVD simulation function S, then the simulation method by Vienot et al. can be expressed as a multiplication of the color with a singular matrix, $M_s$, i.e., S(c)=Msc. The property of singularity may be leveraged to decide the final output color for display.

As mentioned earlier, for the dichromat, the 3D RGB gamut becomes 2D and the colors are contained in a plane after simulation. In the context of the following description, the intersection between the plane and an equi-luminant plane is the dichromacy line. The subset of the line that is within the visible gamut is referred to as the dichromat's line of visibility. The recoloring (daltonization) process converts an input color in the three-dimensional RGB gamut to a color within the two-dimensional plane while preserving luminance. The recoloring may be performed in real time, is temporally stable, and can be adapted to specific CVDs. In an embodiment, recoloring may be configured via a user interface (e.g., control panel) and may provide an improved experience when viewing images and/or videos on mobile phones, tablets, and TVs.

FIG. 1A illustrates an original image 105, the same image 110 as perceived according to protanopia CVD, and an image 115 of relative luminance differences, in accordance with prior art. Image 105 contains dropper bottles filled with red and yellow paints and image 110 is what a person with protanopia CVD perceives, so that the red paint appears dark yellow. The image 115 represents differences in relative luminance between the images 105 and 110, brighter colors in the luminance differences indicate greater differences. The luminance difference is relative to some luminance range that the display can produce. A luminance difference of 0.15, for example, generally does not imply a difference of 0.15 cd/m$^2$ (candela per square meter) between the two images, but could instead be 15 cd/m$^2$ if the luminance range of the display is [0, 100] cd/m$^2$. Ideally, the differences in luminance would be zero (black).

Figure 1B:
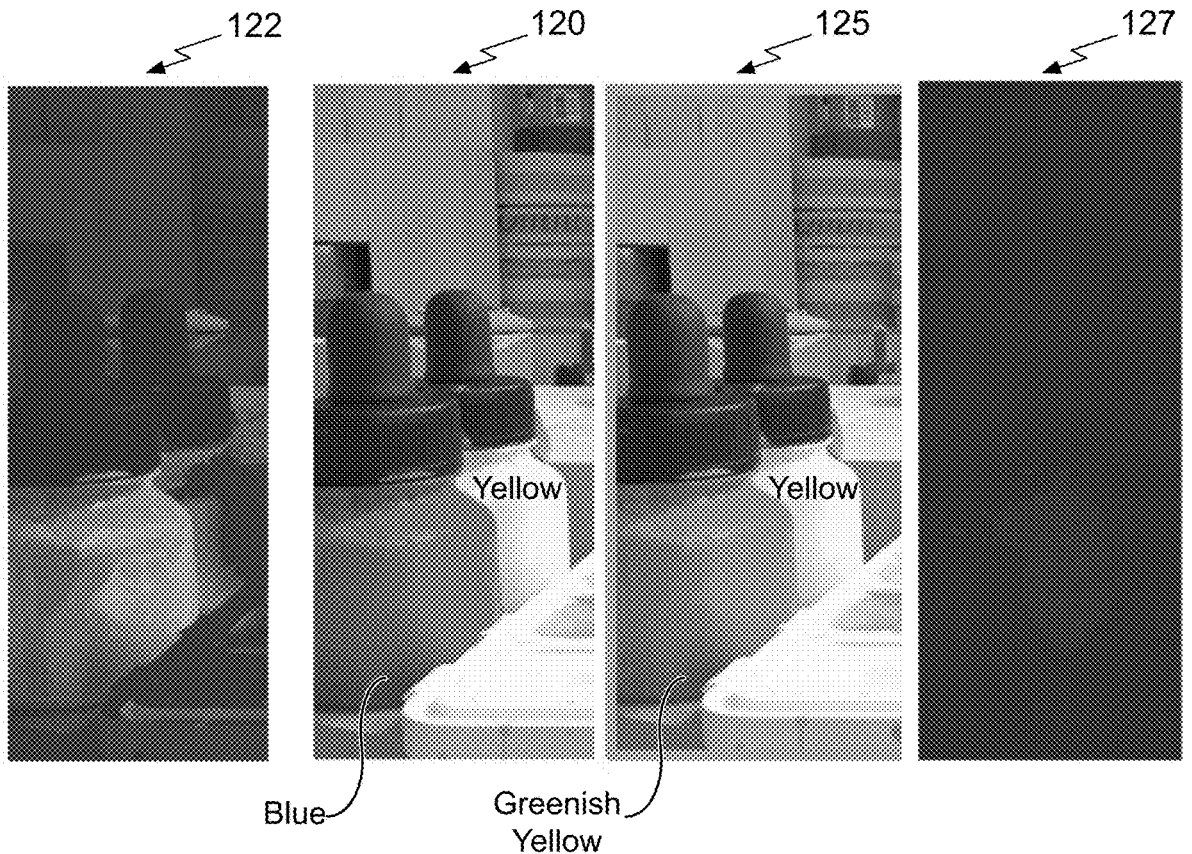
FIG. 1B illustrates the original image recolored using a conventional technique to produce recolored image and recolored using the luminance-preserving technique to produce a recolored image and images of relative luminance differences, in accordance with an embodiment.

FIG. 1B illustrates the original image 105 recolored using a conventional technique to produce recolored image 120 and recolored using the luminance-preserving technique to produce recolored image 125, and images 122 and 127 of relative luminance differences, in accordance with an embodiment. For the conventionally recolored image 120, a person with protanopia CVD perceives the red paint as blue. When the luminance-preserving recoloring technique is applied to the original image 105, the person with protanopia CVD perceives the red paint as greenish yellow.

The image 122 represents differences in luminance between the images 105 and 120, after applying protanopia simulation to image 120. An image 127 represents differences in luminance between the images 105 and 125, after applying protanopia simulation to image 125. As shown in the image 127, luminance differences between the luminance-preserved recolored image 125, after applying protanopia simulation to it, and the original image 105 are nearly zero. In contrast, luminance differences between the conventional recolored image 120, after applying protanopia simulation to it, and the original image 105 are significantly greater than zero. Compared with the conventional recoloring technique, the luminance-preserving technique better preserves luminance of the original image 105.

The luminance-preserving recoloring technique may be applied to the image 105 to produce the image 125 using the following operations. First the input colors ci are converted to a luminance-based color space as c. Second, a function T maps c to a region constrained by a CVD (region of visibility), which for a dichromat is a line. The function T transforms colors so that colors which are confusing to a person with CVD are made distinct and, in an embodiment, the transformed colors may be uniformly distributed on the gamut visible to the person with CVD.

Third, the transformed colors T(c) are back projected to obtain b, such that S(b)=T(c), and linear colors b may then be transformed to sRGB for display. Backprojection adjusts the transformed colors c to find b, such that when a person with CVD views colors b, they will perceive the colors c. In sum, the luminance-preserving technique performs a global transform on image colors, where the global transform is independent of image content and is therefore temporally stable. In an embodiment, the three operations of the global transform may be performed in real time using a 3D lookup table that is indexed using the image colors c.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1C:
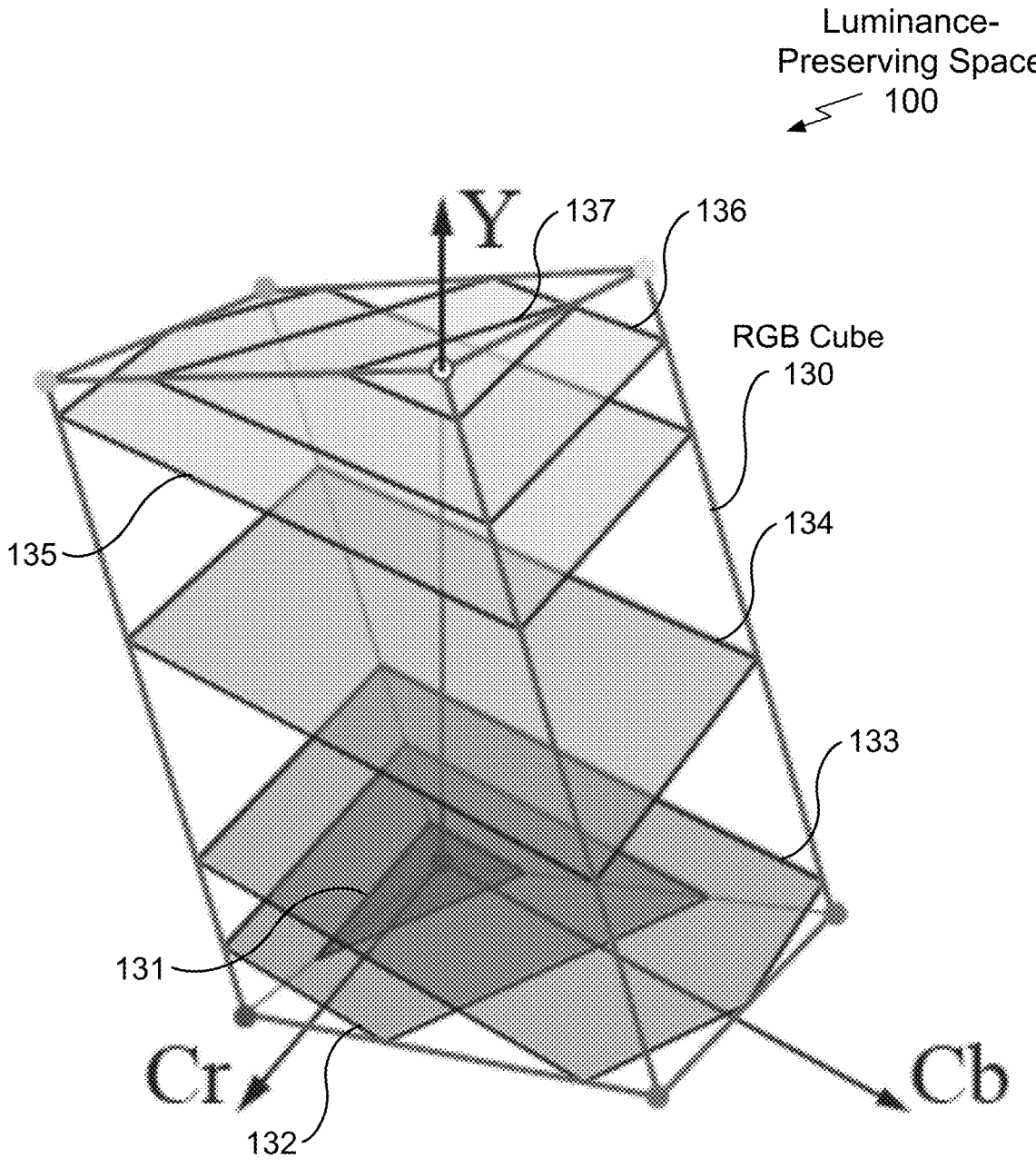
FIG. 1C illustrates vertices of an RGB cube transformed into a luminance-preserving space, in accordance with an embodiment.

FIG. 1C illustrates vertices of an RGB cube 130 (representing RGB color space) transformed into a luminance-preserving color space 100, in accordance with an embodiment. To facilitate preservation of luminance and separate luminance from chrominance, one coordinate axis is used for luminance. For the sake of generality, the luminance-preserving color space 100 is denoted using YUV, where Y is luminance, and UV are chrominances. Choosing Y such that it is computed using one of the standard formulae for luminance (e.g., Y=0.2126r+0.7152g+0.0722b, where rgb is the linear RGB color) is desirable for preserving perceived contrast between the original image as seen by a person with normal color vision and the recolored image as seen by someone with a CVD. Note that using a linear transform for the color space, transforms parallel lines of the RGB cube 130 to a parallelepiped where the parallel lines have new directions and lengths. However, for color spaces, such as HSV, the RGB cube 130 will be transformed into a double cone which may be advantageous in certain scenarios. In addition, a linear color transform is desirable to simplify certain computations and enable precomputation of data for storage in a 3D lookup table that can be accessed using bilinear texture lookup operations. In an embodiment, a linear version of the YCbCr color space is the luminance-preserving space 100, where the Y-channel is linear luminance.

Each discrete luminance value Y is associated with a CbCr equi-luminant plane. For a given luminance, a convex polygon that forms the intersection between the equi-luminance plane and the YUV parallelepiped (i.e., the transformed RGB cube 130) is computed. The polygon may be referred to as a luminance polygon and represents a displayable portion of the equi-luminant plane. FIG. 1C shows luminance polygons 131, 132, 133, 134, 135, 136, and 137 associated with luminances Y=0.05, 0.15, 0.25, 0.50, 0.75, 0.85, and 0.95, respectively. Depending on the luminance and the original color space, the polygon will have a different number of corners. As can be seen, the polygon 131 is a triangle at Y=0.05, then becomes a 4-sided polygon (132) in the equi-luminant plane at Y=0.15, and a 5-sided polygon (133) in the equi-luminant plane at Y=0.25. At Y=0.5, the computed polygon (134) is a 4-sided polygon in the equi-luminant plane. As the luminance increases, the 4-sided polygon is transformed into a 5-sided polygon (135), back to a 4-sided polygon (136), and finally a triangle (137).

The color gamut of a person with dichromacy is a CVD polygon (not shown) in which the luminance axis lies. At a given luminance level, the intersection between the corresponding equi-luminant plane and the CVD plane defines a dichromacy line. The subset of the dichromacy line that is within the visible gamut (i.e., within the YUV parallelepiped) is referred to as the dichromat's line of visibility.

Figure 2A:
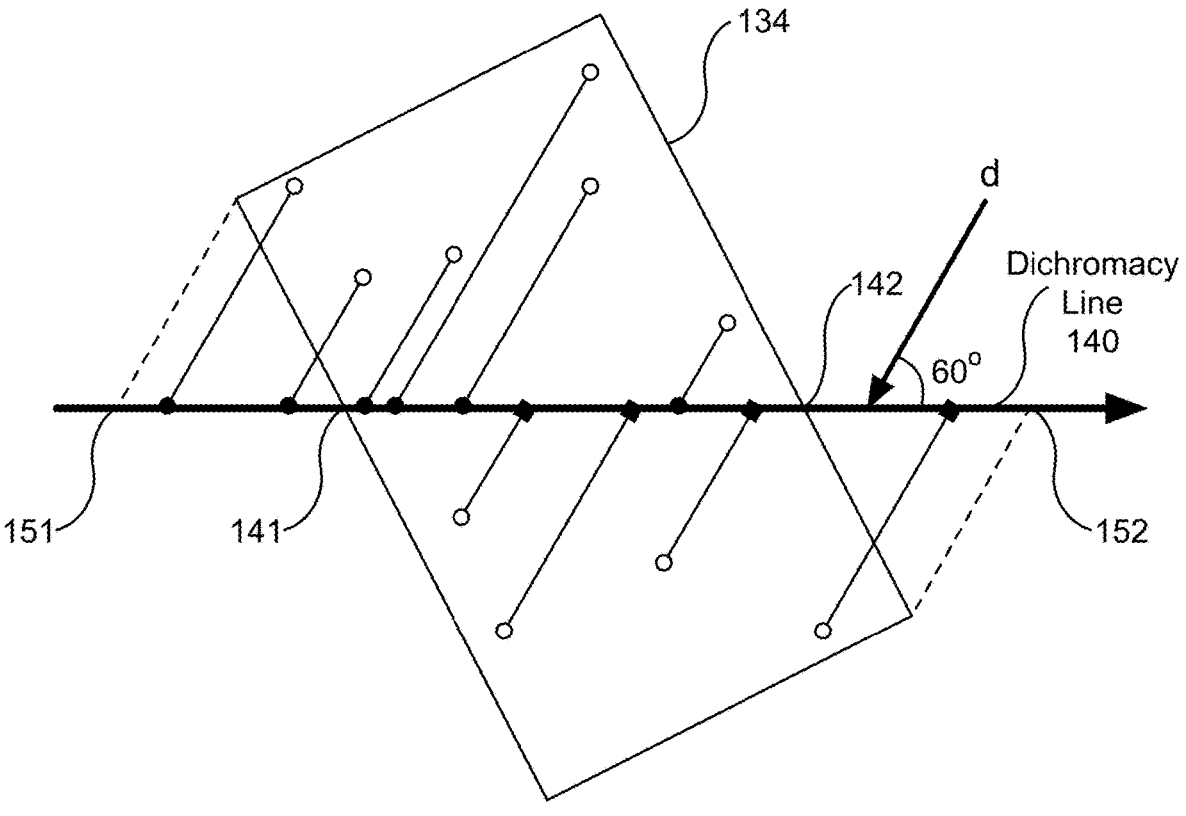
FIG. 2A illustrates sample points within the equi-luminant plane projected to a dichromacy line, in accordance with an embodiment.

FIG. 2A illustrates sample points c within the luminance polygon 134 projected to a dichromacy line 140, in accordance with an embodiment. A transform function, such as T(c), maps or projects the sample points c (indicated by empty circles) within the equi-luminant plane corresponding to luminance polygon 134 to the dichromacy line 140 to produce projected colors P(c) that lie on the dichromacy line 140. In an embodiment, the transform is performed according to projection direction d (arrow) that is angled 60° relative to the dichromacy line 140. Each color sample point c is projected along d until the dichromacy line 140 is intersected and the projected point is denoted P(c).

As shown in FIG. 2A, sample points are projected (transformed) to the dichromacy line 140 within the equi-luminant plane corresponding to luminance polygon 134. Filled circles on the dichromacy line 140 indicate that the original color samples were located above the dichromacy line 140 and are denoted top points. Squares on the dichromacy line 140 indicate that the original color samples were located below the dichromacy line 140 and are denoted bottom points. In an embodiment, the top points correspond to reds while the bottom points correspond to greens.

An interval to which the top points are projected on the dichromacy line 140 is $$[p_Y^t, p_B^t],$$

where an intersection point 151 is $$p_Y^t,$$

and intersection point 142 is $$p_B^t,$$

Y indicates yellow, B indicates blue, and t is for top. Similarly, an interval to which the bottom points are projected on the dichromacy line 140 is $$[p_Y^b, p_B^b],$$

where an intersection point 141 is $$p_Y^b,$$

an intersection point 152 is $$p_B^b,$$

and b is for bottom. An inner pair of projected end points $y_{in}$ and $b_{in}$ are identified, where $y_{in}$ is the rightmost point of $$p_Y^t \text{ and } p_Y^b$$

and $b_{in}$ is the leftmost point of $$p_B^t \text{ and } p_B^b.$$

An outer pair of projected endpoints, $y_{out}$ and $b_{out}$, are identified by the remaining intersection points, leftmost point of $$p_Y^t \text{ and } p_Y^b$$

and the rightmost point of $$p_B^t \text{ and } p_B^b,$$

respectively.

The portion of the dichromacy line between the inner pair of projected end points (the intersection points 141 and 142) is the dichromat's line of visibility and it represents color visibility for a severe case of CVD. Some of the projected sample points are inside the equi-luminant plane corresponding to luminance polygon 134, i.e., on the dichromat's line of visibility, while the remaining projected sample points are on the dichromacy line 140, but outside of the dichromat's line of visibility. In the general case, for lower severities (anomalous trichromacy), the visible gamut is not two-dimensional but a volume that continuously degenerates into a two-dimensional polygon as the severity of the CVD increases. The intersection of the volume (not shown) with the equi-luminant plane corresponding to luminance polygon 134 can be simplified to a polygon that degenerates to the dichromat's line of visibility.

Projection according to the projection direction d does result in some points being mapped to locations on the dichromacy line 140 that are outside of the luminance polygon 134 and are therefore not within the dichromat's line of visibility. In an embodiment, the projection direction is chosen empirically. In an embodiment, the projection direction is chosen by optimization for a given target such as, for example, minimizing luminance and chrominance loss. It should be noted that even though the projection shown in FIG. 2A provides an initial set of points on the dichromacy line 140 which works well in practice, it doesn't enforce a strong separation of color points relative to their original distance to the dichromacy line 140. In some cases, the weak separation can result in some lack of color discrimination. To improve the projection, in an embodiment, the projection along a direction d is replaced with a mapping from the original 2D location of the color points inside the luminance polygon to the dichromacy line 140, using some form of space-filling curves, such as a Morton or a Hilbert curve.

Figure 2B:
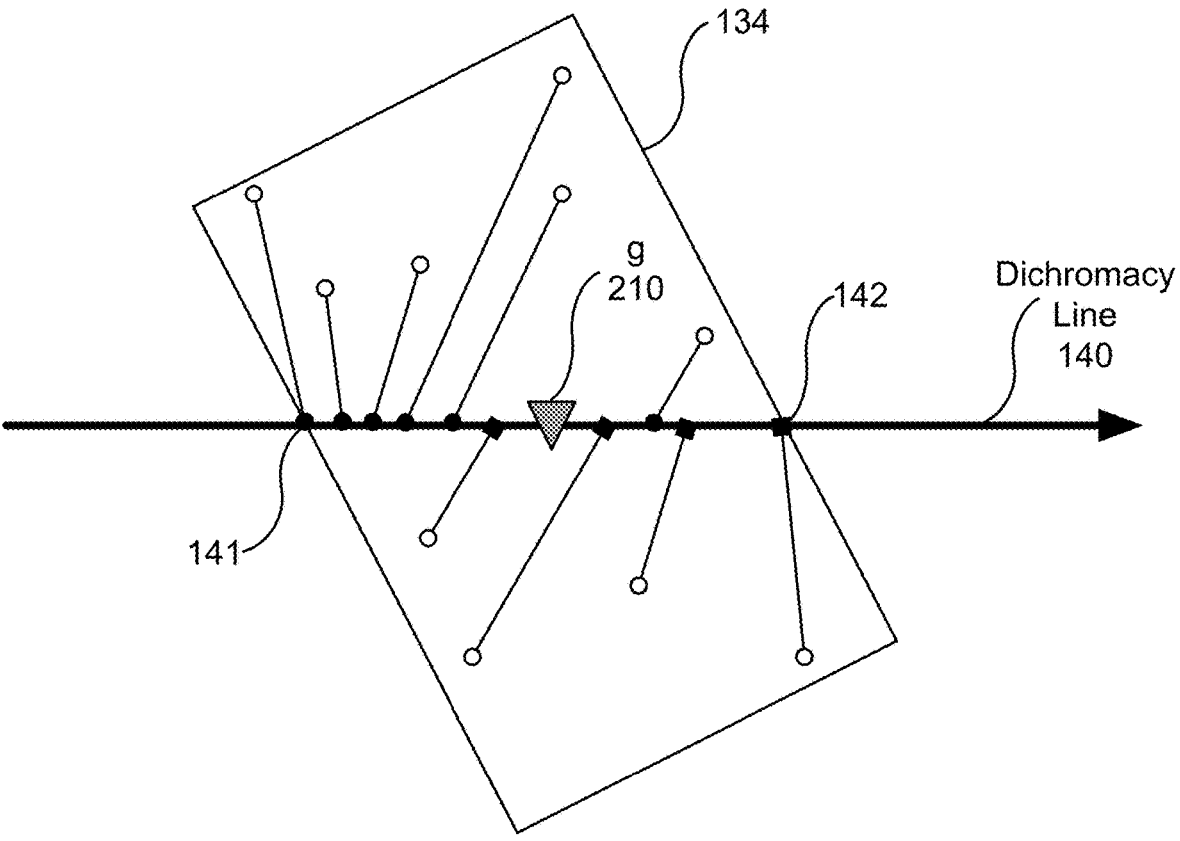
FIG. 2B illustrates sample points within the luminance polygon mapped to the dichromacy line and within the dichromat's line of visibility, in accordance with an embodiment.

FIG. 2B illustrates sample points within the luminance polygon 134 mapped to the dichromacy line 140 and within the dichromat's line of visibility, in accordance with an embodiment. The sample points within the luminance polygon 134 are transformed using the transform function T(c) which generates a new point on the dichromat's line inside the luminance polygon 134, i.e., on the dichromat's line of visibility. In an embodiment, the transform function T(c) is applied directly to the sample points to produce the color points on the dichromat's line of visibility as a single operation. In another embodiment, the transform function T(c) comprises operations such that the sample points are first projected to produce the projected points on the dichromacy line 140 and then the projected points are transformed to produce the color points within the dichromat's line of visibility.

A gray color at a gray point, g 210 lies on the dichromacy line 140. Because the luminance axis lies in the CVD gamut, there is always a gray color on the dichromacy line 140. The gray point is the point in an equi-luminant plane where the color channels (e.g., Cr and Cb) are zero. In other words, it's the point in the equi-luminant plane that lies on the luminance axis. For the equi-luminant plane with luminance y, the YCbCr color of the gray point in that plane is (y, 0,0).

All sample points that are projected to the left side of the gray point g 210 are linearly remapped so that the sample point furthest away to the left on the dichromacy line 140 ends up at the intersection point 141 where the dichromacy line 140 intersects the left side of the luminance polygon 134. A similar operation is applied to the sample points that are projected to the right side of the gray point g 210 so that the sample point furthest away to the right on the dichromacy line 140 ends up at the intersection point 142. A result is that the gray point g 210 is preserved, and all projected sample points lie within the dichromat's line of visibility.

Figure 2C:
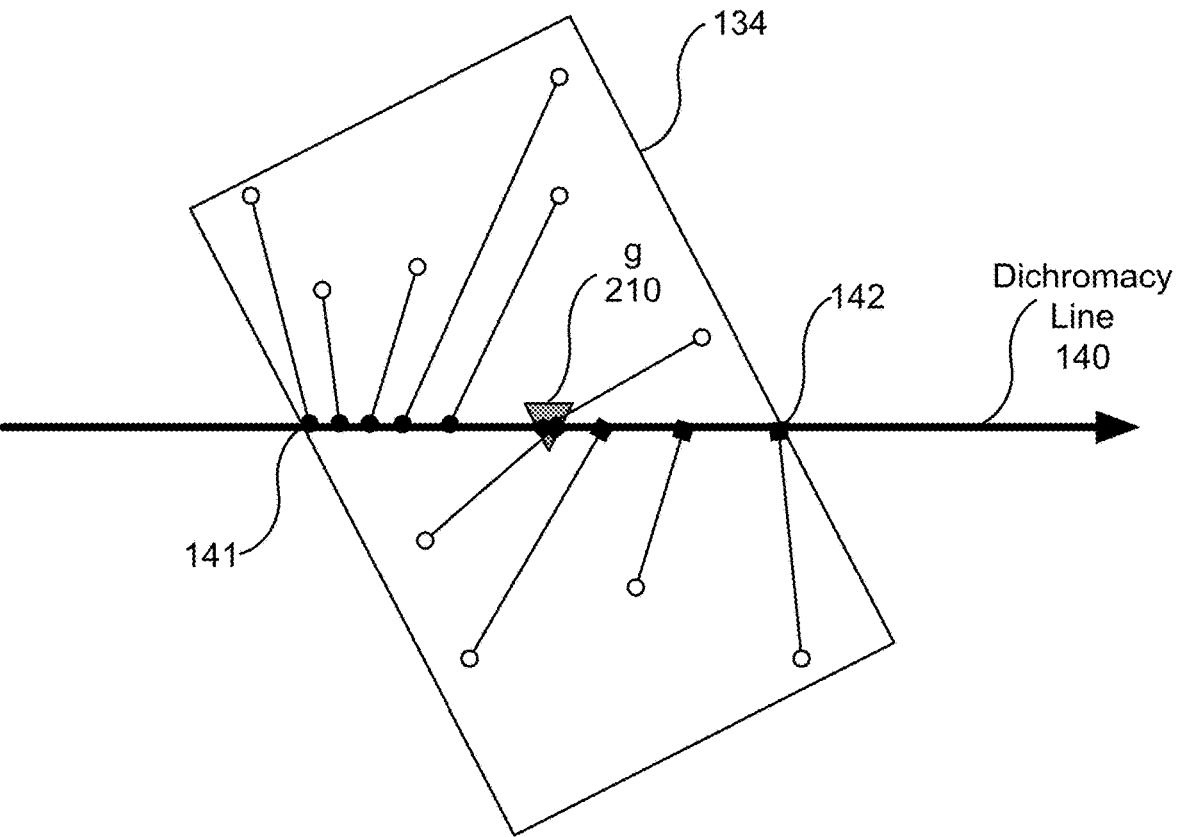
FIG. 2C illustrates another remapping of the projected sample points to the dichromat's line of visibility, in accordance with an embodiment.

FIG. 2C illustrates another remapping of the projected sample points to the dichromat's line of visibility, in accordance with an embodiment. Common dichromacy results in green and red colors being perceived similarly. In the example, the top sample points are associated with red colors and the bottom sample points are associated with green colors. To counteract the red-green color confusion of the dichromat, the green colors may be moved closer to gray and blue by linearly remapping the bottom sample points to the right side of the gray point (corresponding to blues) and remapping the top sample points to the left side of the gray point (corresponding to yellows). The projected sample points may be linearly remapped such that the top point that is projected furthest to the left is mapped to the left intersection point 141 of the dichromacy line 140 and the luminance polygon 134. The rightmost projected top point is mapped to the gray point g 210. In sum, Top points are remapped to points on the dichromat's line of visibility that are left of the gray point g 210. Bottom points are remapped to points on the dichromat's line of visibility that are right of the gray point g 210.

Conversely, the leftmost projected bottom point is mapped to the gray point g 210 while the rightmost projected bottom point is mapped to the right intersection point 142 of the dichromacy line 140 and the luminance polygon 134. Note that in an embodiment, the bottom points (greens) map to the yellow part of the dichromat's line of visibility while the top points (reds) map to the blue part of the dichromat's line of visibility. In an embodiment, configuration of the mapping may be determined by a user or any metric. In an embodiment, the mapping shown in FIG. 2C is referred to as a differentiating mapping.

In an embodiment, the transform function T(c) is applied directly to the sample points to produce the differentiating mapping color points as a single operation. In another embodiment, the transform function T(c) comprises operations such that the sample points are first projected to produce the projected points on the dichromacy line 140, then the projected points are transformed to produce the color points inside the luminance polygon, and finally the color points inside the luminance polygon are remapped to complete the differentiating mapping. In another embodiment, the transform function T(c) comprises operations such that the sample points are first projected to produce the projected points on the dichromacy line 140, then the projected points are remapped to complete the differentiating mapping.

Figure 2D:
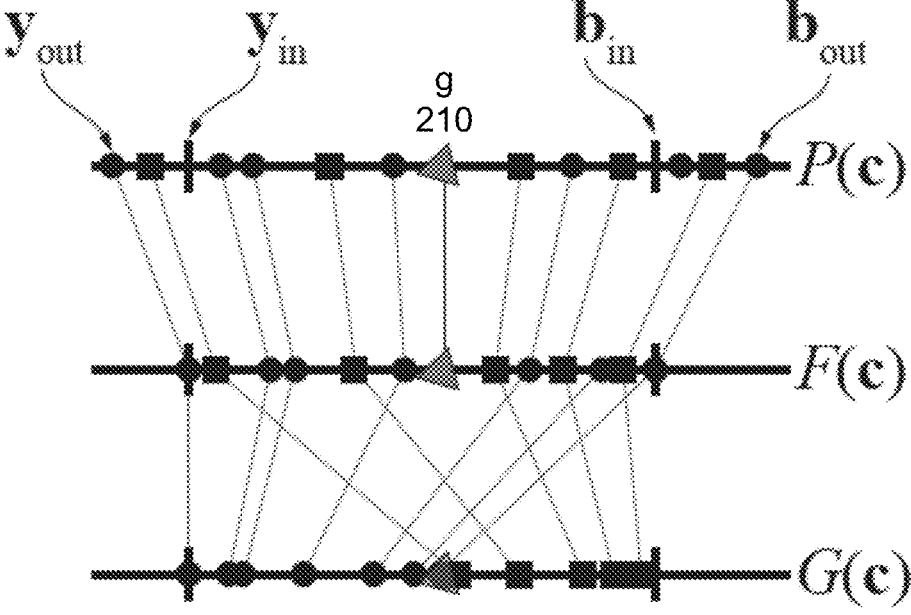
FIG. 2D illustrates remappings of the projected sample points to the dichromat's line of visibility, in accordance with an embodiment.

FIG. 2D illustrates remappings of the projected sample points to the dichromat's line of visibility, in accordance with an embodiment. As previously described, after the projection shown in FIG. 2A, one or more of the projected sample points P(c) may lay outside $[y_{in}, b_{in}]$. A linear remapping function $Q(p, p_s, p_e, q_s, q_e)$ is defined, which assumes that p lies on the line segment from $p_s$ to $p_e$ and remaps $p=p_s+t(p_e-p_s)$ to $q_s+t(q_e-q_s)$. In order to preserve the gray point g 210, the projected colors may be remapped as follows. If the projected color P(c) is to the left of the gray point, g 210, on the dichromacy line 140, then the remapped point is $Q(P(c), y_{out}, g, y_{in}, g)$. Similarly, if the projected color P(c) is to the right of the gray point g 210, it is remapped as $Q(P(c), b_{out}, g, b_{in}, g)$. The resulting color after this remapping is denoted F(c), as shown in FIG. 2B.

The final remapped points should preserve colors c close to the dichromacy line 140, while making it possible to distinguish between red and green colors further away from the dichromacy line 140. To make that possible, a differentiating mapping G may be used, which maps points above the dichromacy line 140 to the left of the gray point g 210 and points below to the right of the gray point g 210, as shown in FIG. 2C. For points above, the remapping may be accomplished by $Q(F(c), y_{in}, b_{in}, y_{in}, g)$ and for points below, the remapping may be accomplished by $Q(F(c), y_{in}, b_{in}, g, b_{in})$.

In an embodiment, a final remapped point (not shown) is an interpolated intermediary color H(c)=(1-t)F(c)+tG(c), where t is proportional to the ratio of the height of c from the dichromacy line 140 ($h_c$, the closest distance between c and the dichromacy line) and the maximum of $h_T$ and $h_B$, where $h_T$ is the closest distance between the furthest point on the top of the luminance polygon 134 to the dichromacy line 140 and $h_B$ is the closest distance between the furthest point on the bottom of the luminance-polygon 134 to the dichromacy line 140. In an embodiment, t is computed as the ratio between $h_C$ and either $h_T$ or $h_B$, depending on whether c is situated above or below the dichromacy line 140, respectively. In an embodiment, t is computed as the ratio between $h_C$ and the average of $h_T$ and $h_B$. In an embodiment, t is computed as the ratio between $h_C$ and the minimum of $h_T$ and $h_B$, with a small offset to avoid division by zero if either $h_T$ or $h_B$ is zero. In an embodiment, t=min(kr, 1), where r is the ratio, and the factor k is determined empirically. In an embodiment, k=3. In an embodiment, t depends on the distance between the original color and the gray point g 210 in a way that leads to colors close to gray being changed less than colors further from gray. In an embodiment, the interpolation between two transformed points is not performed and the final remapped point is produced by one or more of the projection and remapping operations.

In an embodiment, to increase the usage of the available colors on the dichromat's line of visibility, a final operation performs a separate weighted histogram equalization of colors H(c) to the left of the gray point g 210 and to the right of g 210. Because H(c) is only dependent on the position of c inside the luminance polygon 134, histograms of the colors that H transforms to the right and left sides of the gray point g 210 may be precomputed by uniform sampling of the entire luminance polygon 134. The more sample points are used, the better the equalization will be. In an embodiment, 10,000 points were sampled. In an embodiment, the equalization operation is performed after the H(c) interpolation or, when the H(c) interpolation is not used, after one or more of the projection and remapping operations. In an embodiment, equalization may be accomplished by computing a cumulative distribution function from the histogram of points mapped to the dichromat's line of visibility and accessing the cumulative distribution function for all the points H(c). In an embodiment, during accesses, linear interpolation between two adjacent bins is used, which assumes (as a reasonable approximation) a linear relation between the bins. In the case of anomalous trichromacy, the remapped colors will be located on a polygon rather than a line. Histogram equalization can be done for that case as well.

While the remapping variations with or without interpolation provide good results for the mid-range of luminances, skewed results may be produced in the darker and brighter areas of an image. For example, a dark gray shadow could become dark blue after equalization. To counteract this, the histogram counts may be weighted with a function w(i,l), where i is the bin index starting from the gray point g 210 and going outward on both sides, and l is the luminance, i.e., $$w(i, l) = (0.1 + 0.9s)(1 - q) + q, \qquad \text{Eq. (1)}$$

where $q=i/(n-1)\in [0,1]$ for n bins and $s=1-2|l-0.5|$. In other embodiments, a different weighting function is used. The bin counts are weighted with a linear ramp, starting at w=0.1 for l=0, at low and high luminances and w goes toward a constant function, w=1, for l=0.5. Applying histogram equalization of H(c), using the weighted histograms, gives the final color T(c) on the dichromat's line of visibility.

The transform function, T, maps an input color c to a color T(c) on the dichromat's line of visibility at the same luminance as the input color. In an embodiment, the transformation T comprises one or more of projection, remapping, interpolation, and equalization operations. In an embodiment, the transformation T comprises equalization without remapping. The transformed color is the color that the color-deficient should perceive. However, presenting the transformed color directly might not achieve this, because the person with the CVD will perceive the color S(T(c)), where S is the CVD simulation function. If S is one of the matrix multiplications proposed by Machado et al. in A Physiologically-Based Model for Simulation of Color Vision Deficiency. *IEEE Transactions on Visualization and Computer Graphics* 15, 6 (2009), 1291-1298, S(T(c)) is not equal to T(c). If S is one of the matrix multiplications proposed by Vié not et al. in VIÉNOT F., BRETTEL H., MOLLON J. D.: Digital Video Colourmaps for Checking the Legibility of Displays by Dichromats. *Color Research & Application* 24, 4 (1999), 243-252, S(T(c)) is equal to T(c). Assuming S is invertible: Before the transformed color is presented, the inverse of S is applied to the transformed color, creating the displayed color $c_d=S^{-1}(T(c))$, so that the CVD viewer sees $S(c_d)=S(S^{-1}(T(c)))=T(c)$. However, this is not always practically possible, because the inverse $S^{-1}$ may not exist, or the adjusted color, ca, is out of the displayable and visible color space. In the context of the following description, a process of back-projection provides possible solutions to these issues.

In summary, the input color, is converted to a luminance-based color space as c. The function T maps the converted color c to the dichromat's line of visibility. The remapped converted color T(c) is then back-projected to obtain b, such that S(b)=T(c), and the linear color b may be converted to sRGB color space for display.

A dichromat will perceive several of the RGB colors as the same color under the assumption that their visible gamut is two-dimensional. This feature may be leveraged to determine the final, displayed color ca. To make the recolored output more accessible to people without a CVD, or to one with a lower severity, it may be advantageous to present an image that is as similar to the original image as possible, under the constraint that the dichromat should perceive the color T(c) as computed. The approach is to present a back-projected color b which satisfies S(b)=T(c). If the CVD simulation is done by a matrix multiplication with matrix $M_s$ and $M_s$ is a pure projection. $M_s$ is singular and its nullspace consists of a single vector, n. Due to the properties of the nullspace, $S(T(c)+tn)=T(c)$ for all t∈ℝ i.e., all colors T(c)+tn are perceived as T(c) by the dichromat. Therefore, b is computed using n as $$b = T(c) + (n \cdot (c - T(c)))n. \qquad \text{Eq. (2)}$$

Equation (2) gives the color closest to the original color, c, while also being perceived as T(c) by the dichromat. In an embodiment, when the point b falls outside the color space's visible gamut, b is converted to linear RGB and clamped to [0, 1]3. Clamping may cause a small change in luminance compared to the original image.

When the inverse of S, $S^{-1}$ does exist (meaning that S is not a pure projection) the back-projection should be adjusted. T(c) only contains values on the dichromacy line, so when S is a pure projection, the values of S(T(c)) are also on the dichromacy line and S(T(c))≠T(c). For the case when the simulation function S is a matrix multiplication, the properties of the simulation matrix, M can be considered. A singular value decomposition reveals that two singular values are about equally large while the third is about $10^{-7}$, which is close to zero. Thus, the matrix is close to singular and is not invertible in practice. A new version of the simulation matrix may be created by setting the smallest singular value to zero and recomputing the matrix based on the results of the initial singular value decomposition. In particular, given $M=U\Sigma V^T$, where $\Sigma$ is a diagonal matrix with the singular values $\sigma_1 \geq \sigma_2 \geq \sigma_3$, ordered by descending magnitude, on its diagonal, the matrix $\overline{M}$ is computed as $$\overline{M} = U \begin{pmatrix} \sigma_1 & 0 & 0 \\ 0 & \sigma_2 & 0 \\ 0 & 0 & 0 \end{pmatrix} V^T. \qquad \text{Eq. (3)}$$

The matrix $\overline{M}$ is singular, meaning that it has a non-empty nullspace. The nullspace consists of a single vector, v, i.e., a vector v such that the matrix $\overline{M}$ is, which implies that the matrix $\overline{M}$ (c+sv)=$\overline{M}$c is for all s∈ ℝ.

Figure 2E:
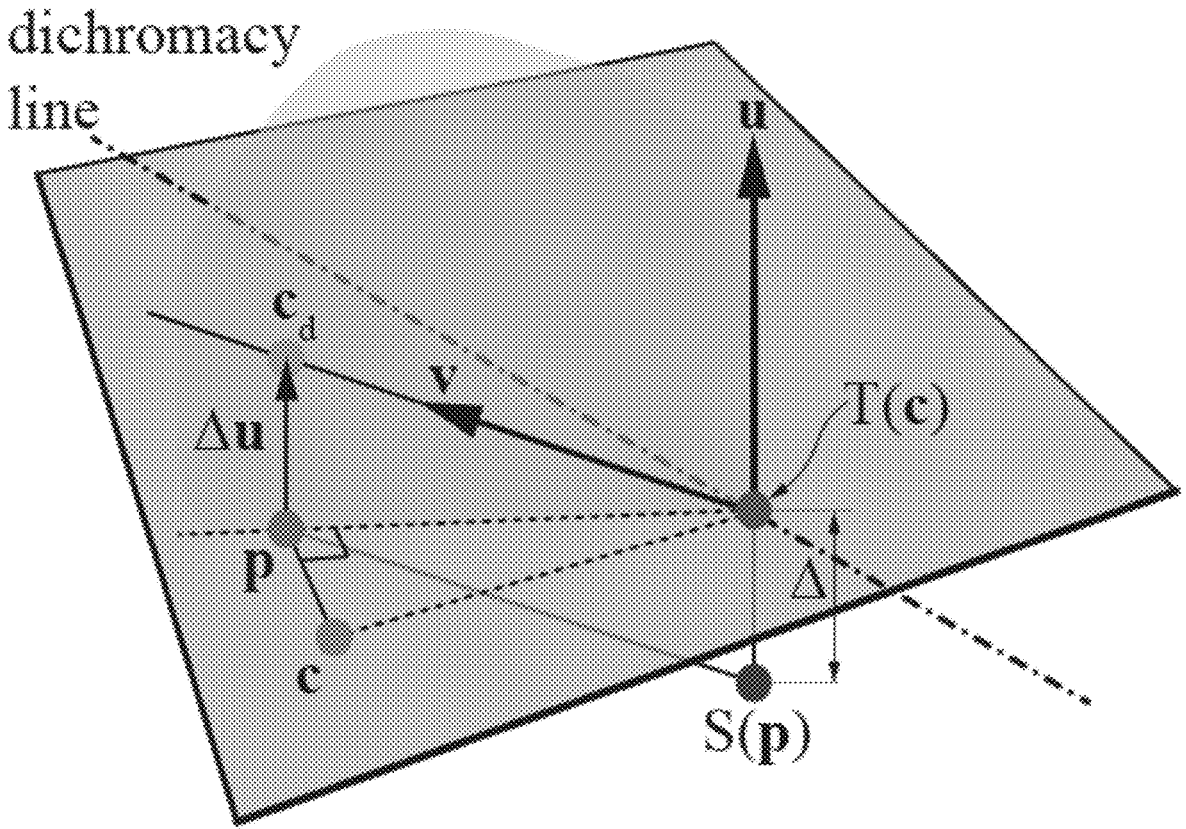
FIG. 2E illustrates back-projection, in accordance with an embodiment.

FIG. 2E illustrates back-projection, in accordance with an embodiment. Given the nullspace vector, v, the colors that will map to T(c) when the adjusted simulation matrix, $\overline{M}$ are applied are known. At this point, the color c may be projected orthogonally onto the line defined by the point T(c) and the nullspace vector to produce the daltonized color, $c_d$. This is preferable when the simulation functions are proper projections. However, this is not the case when Machado et al.'s simulation is used. An alternative is to project the color c onto the plane that goes through T(c) and is spanned by the nullspace vector and an up-vector which informs how an already CVD-simulated color changes when the simulation is applied again. That is, the up vector, u, is parallel to S(S(c))-S(c). The up-vector for the simulation matrix, $\overline{M}$, can be approximated from the matrix $\overline{M}$ in Equation 3. The original point c is orthogonally projected to this plane with maintained luminance, which gives p. The distance, $\Delta$, between T(c) and S(p) is computed. Finally, the back-projected point is $c_d=p+\Delta u$. The back-projected point $c_d$ projects to the point T(c) when the CVD simulation is applied to it, which is the goal of the back-projection. In an embodiment, when the point $c_d$ falls outside the color space's visible gamut, ca is converted to RGB and clamped to [0, 1]3. Clamping may cause a small change in luminance compared to the original image. Advantageously, the back-projection operation may be implemented in a system using any recoloring techniques, including conventional techniques.

Figure 3A:
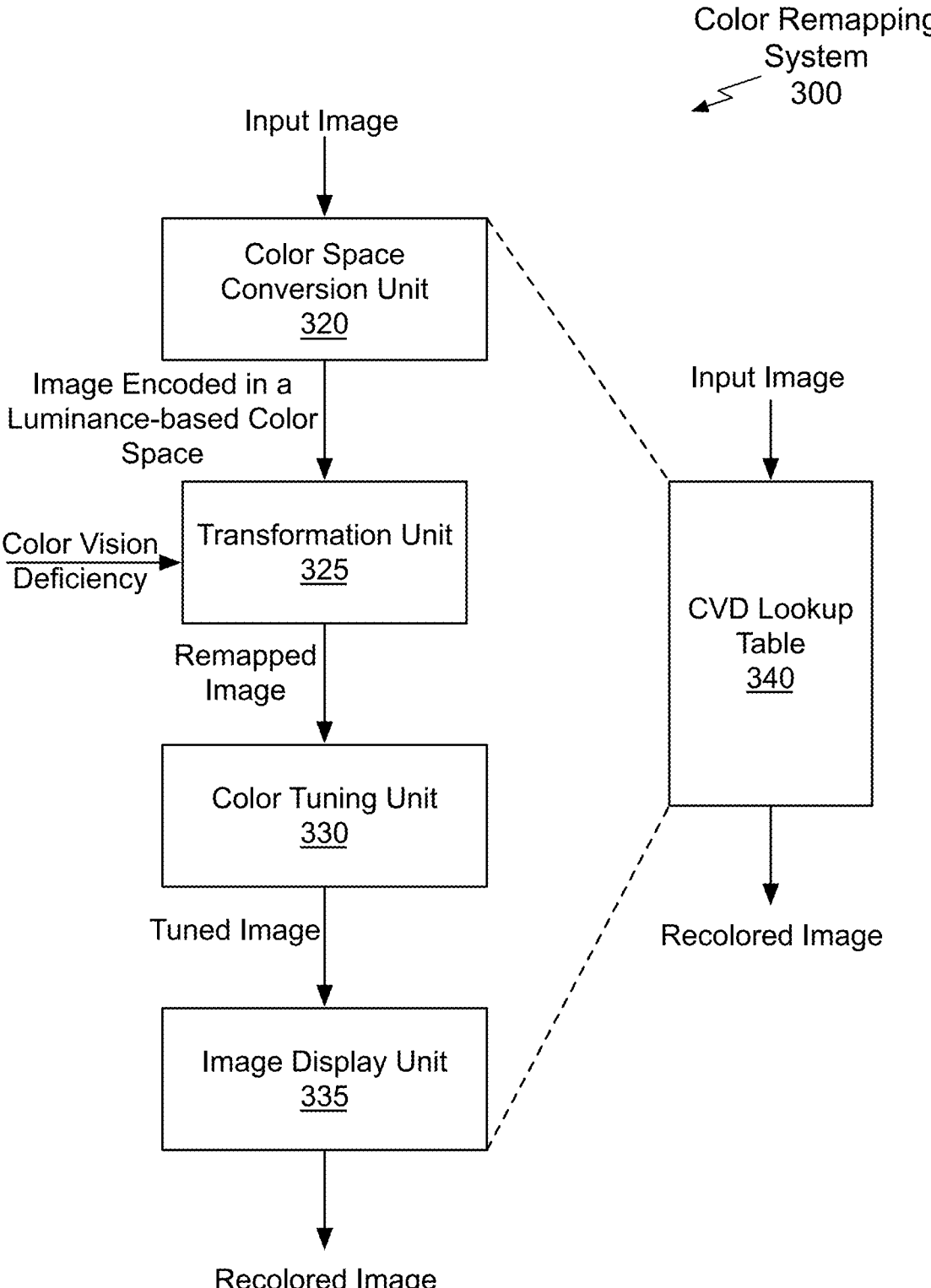
FIG. 3A illustrates a block diagram of an example color remapping system suitable for use in implementing some embodiments of the present disclosure.

FIG. 3A illustrates a block diagram of an example color remapping system 300 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the remapping system 300 is within the scope and spirit of embodiments of the present disclosure.

The remapping system 300 includes a color space conversion unit 320, a transformation unit 325, a color tuning unit 330, and an image display unit 335. Alternatively, in an embodiment, the color remapping system 300 is implemented using a CVD lookup table 340. The color space conversion unit 320 receives an input image and converts pixel colors in the input image to produce a converted image that is encoded in a luminance-based color space. For example, the input image encoded in RGB space may be converted to a linear version of the YCbCr color space, where each discrete luminance value Y is associated with a CbCr equi-luminant plane.

The transformation unit 325 implements a transform function T that may comprise one or more of the operations shown in FIGS. 2A, 2B, 2C, and 2D for processing the converted colors to produce a remapped image. In an embodiment, the transform function T also includes interpolation and/or equalization operations. In an embodiment, CbCr colors (sample locations) within an equi-luminant plane are projected according to a projection direction d to locations within a region that is constrained by the CVD, such as the dichromacy line 140. Note that multiple CbCr colors may be projected to the same location within the region. As shown in FIGS. 2A and 2D, while the projected colors P(c) are within the region, some of the projected colors may lie outside the dichromat's line of visibility.

In an embodiment, the projected colors are remapped within the region using a transform function F to perform a linear remapping with gray point preservation. The transform function F produces remapped colors F(c) that all lie within the dichromat's line of visibility (the CVD color gamut), as shown in FIGS. 2B and 2D. The transform function F may be applied to the projected colors P(c) or may be applied directly to the converted colors. In an embodiment, the projected colors are remapped within the CVD color gamut to separate (opposing) areas within the CVD color gamut to differentiate the projected colors, as shown in FIGS. 2C and 2D.

In an embodiment, the transformation unit 225 interpolates, based on t, between remapped colors produced using different transform functions to produce a final remapped color. In an embodiment, the remapped colors are redistributed (equalized) within the displayable CVD color gamut. The remapped (daltonized) image generated by the transformation unit 325 appears the same to a person with or without the CVD (assuming the color deficiency is described by a pure projection, as in VIÉNOT F., BRETTEL H., MOLLON J. D.: Digital Video Colourmaps for Checking the Legibility of Displays by Dichromats. *Color Research & Application* 24, 4 (1999), 243-252) and has luminance values which are the same as the input image.

The color tuning unit 330 receives the remapped image and performs back-projection to generate a tuned image. When the tuned image is displayed (after conversion back to the original color space), a person with the CVD will see the daltonized image and a person without CVD will see the tuned image. Because multiple colors look the same to a person with CVD, in order for the CVD person to see the daltonized color T(c) generated by the transformation unit 325, any color within a set of colors that are perceived as T(c) by the CVD person may be selected for display. In particular, a color within the set that is closest in value to the original color may be selected as the tuned color. The tuned color may look similar to the original color for someone with normal color vision, while the CVD person will see the daltonized color T(c). The corresponding tuned colors remain in their respective luminance polygons.

The image display unit 335 converts the tuned image represented in the luminance-based color space back into the format used to represent the input image (or another suitable format) to produce a recolored image. In an embodiment, one or more of the color space conversion unit 320, transformation unit 325, color tuning unit 330, and image display unit 335 are replaced with the CVD lookup table 340 or a texture lookup unit. In particular, a texture lookup may be implemented that receives pixel colors in the input image or in the encoded input image (in the luminance-based color space) and the color vision deficiency and generates pixel colors in the recolored image or in the tuned image (in the luminance-based color space). In an embodiment, the color remapping system 300 is implemented within a display device. In an embodiment, the color remapping system 300 is implemented within specialized unit for display operation in a system-on-chip (SoC).

FIG. 3B illustrates a flowchart of a method 350 for luminance-preserving and temporally stable daltonization, in accordance with an embodiment. Each block of method 350, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 350 is described, by way of example, with respect to the remapping system 300 of FIG. 3A. However, this method may additionally or alternatively be executed by any one system, or any combination of systems, including, but not limited to, those described herein. Furthermore, persons of ordinary skill in the art will understand that any system that performs method 350 is within the scope and spirit of embodiments of the present disclosure.

At step 355, an image encoded in a luminance-based color space is obtained. In an embodiment, an original image in a first color space is converted to the image encoded in the luminance-based color space.

At step 360, a first color of a pixel in the image is projected, according to a projection function, to a region within an equi-luminant plane in the luminance-based color space to produce a projected color as the first color for the pixel, where the region is constrained by the color vision deficiency. In an embodiment, the region is a line or a plane. In an embodiment, the projected color is remapped to lie within a displayable CVD gamut. In an embodiment, the displayable CVD gamut comprises the dichromat's line of visibility.

At step 365, first colors in the image are remapped to produce second colors in a recolored version of the image, where the second colors are constrained by a color vision deficiency and luminance values of the second colors and the respective first colors are equal. In an embodiment, luminance values that are within 5% of the same value are considered substantially equal. In an embodiment, the recolored version of the image is converted from the luminance-based color space to the first color space. In an embodiment, the second colors are stored as texels in a texture map, wherein each second color is accessed by a corresponding one of the first colors.

In an embodiment, the region separates the luminance polygon into a first sub-plane and a second sub-plane, and first color samples within the first sub-plane are remapped to a first portion of the region and second color samples within the second sub-plane are remapped to a second portion of the region. In an embodiment, the region separates the first and second color samples into top and bottom color samples, as shown in FIG. 2C. In an embodiment, a gray color point on a luminance axis separates the first portion of the region and the second portion of the region.

In an embodiment, the projected color is remapped to a third color within a CVD gamut and the third color is remapped to a fourth color of the first color samples, and further comprising interpolating between the third color and the fourth color to produce the second color for the pixel. In an embodiment, the projected color is remapped to the third color using the remapping function Q to produce the fourth color (F(c)), as shown in FIG. 2D. In an embodiment, the projected color is remapped to the third color using the remapping functions Q and G to produce the fourth color (G(c)), as shown in FIG. 2D. In an embodiment, the third color and the fourth color are interpolated based on at least one distance between the first color and the region. In an embodiment, the distance is t. In an embodiment, the remapping comprises redistributing color samples within the region to equalize a distribution of the color samples within the region (i.e., the CVD gamut).

In an embodiment, for a pixel in the recolored version of the image, the second color is selected from a subset of color samples within the region that are perceived by a CVD observer as equal to the second color and is closest in value to the first color for the pixel. In an embodiment, the second color is selected using back-projection. In an embodiment, for step 365 remapping each one of the first colors in the image to produce the second colors is consistent with the remapping of the first colors in one or more additional images in a sequence, so that a temporally stable recolored sequence of images is produced. In an embodiment, at least one of the steps 355 or 365 is performed on a server or in a data center to generate the recolored version of the image, and the recolored version of the image is streamed to a user device. In an embodiment, at least one of the steps 355 or 365 is performed within a cloud computing environment. In an embodiment, at least one of the steps 355 or 365 is performed for training, testing, or certifying a neural network employed in a machine, robot, or autonomous vehicle. In an embodiment, at least one of the steps 355 or 365 is performed on a virtual machine comprising a portion of a graphics processing unit (GPU).

For each source color, $(r_s, g_s, b_s)$, a final destination color may be precomputed using the method 350. Therefore, all of the colors for a specific type of CVD may be precomputed and stored in a lookup table, such as the CVD lookup table 340, providing real time performance. In an embodiment, a 3D texture of n×n×n resolution is allocated and each texel in the texture contains the destination color in RGB. Depending on the platform, desired accuracy, and speed, different values may be selected for n. Selecting n=256 should cover all 24-bit displays and render targets, requiring $3 \times 256^3 = 48$ MB of memory when the destination color is stored using 3 bytes. Because trilinear interpolation can be used when performing a lookup in the 3D textures and the content of the texture will vary smoothly, it is likely that a smaller resolution would also work well. For example, selecting n=64 will cost $3 \times 64^3 = 768$ kB of memory. Note that 48 MB is a single 4k×4k RGB texture, which is not considered large on a modern GPU. In addition, the 3D texture will contain very smooth content, so it can be compressed using conventional texture compression techniques, to further reduce the 48 MB texture to a 16 or 8 MB texture.

The luminance preserving recoloring technique preserves luminance in the sense that both the person with CVD and a person without a CVD will perceive the same luminance in the recolored image. Because people with CVD perceive gray the same as people without a CVD, the gray values are also preserved. Recolored images are also temporally stable because the technique does not depend on the image content. The implementation may be configured to support various types of CVD, including both deuteranopia and protanopia. The recoloring may also be configured using a small set of parameters to control contrast and naturalness preservation.

Parallel Processing Architecture

Figure 4:
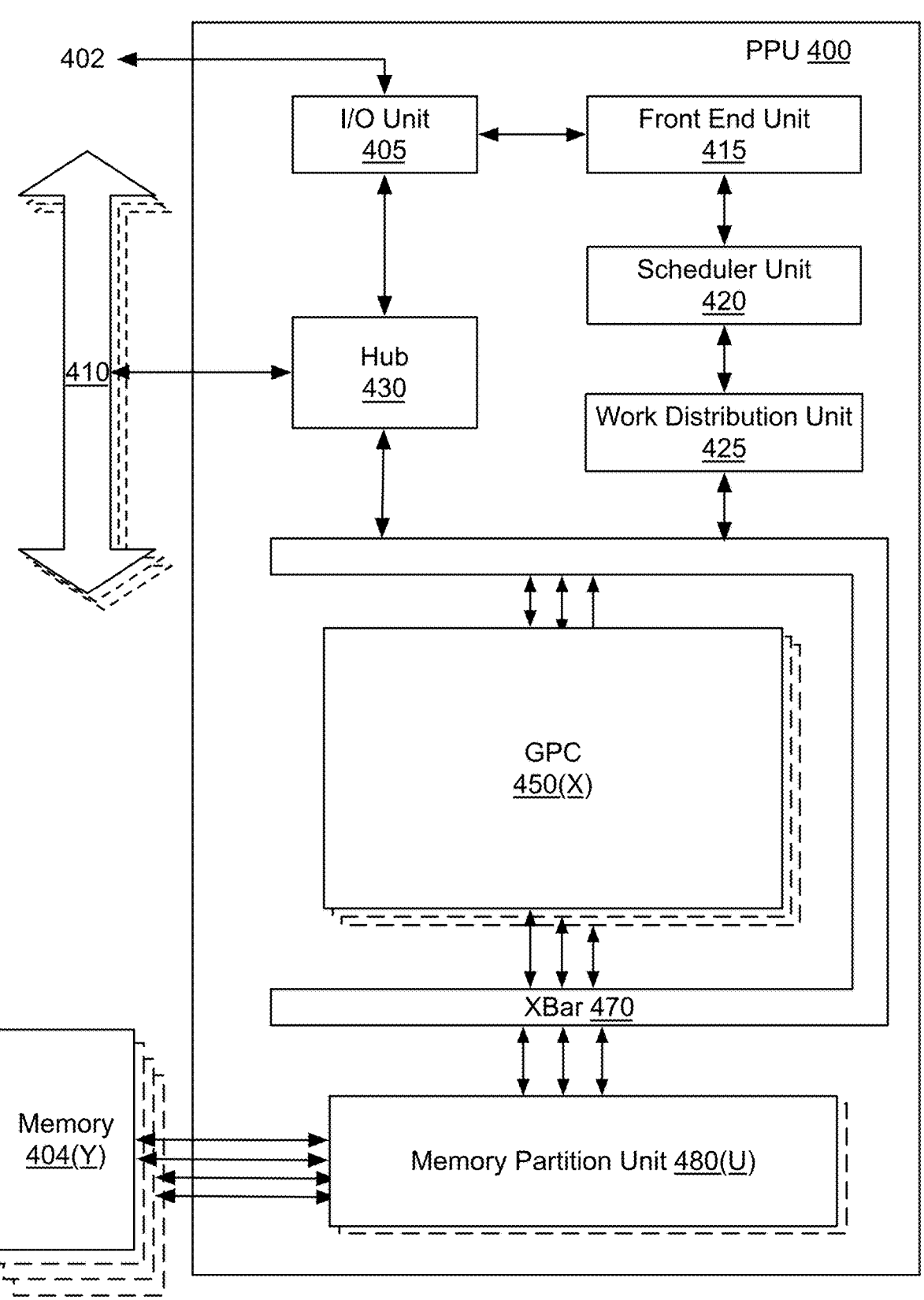
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the method 350 for luminance-preserving and temporally stable daltonization. The PPU 400 may be used to implement one or more of the color space conversion unit 320, transformation unit 325, color tuning unit 330, and image display unit 335 within the remapping system 300. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in an L2 cache, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
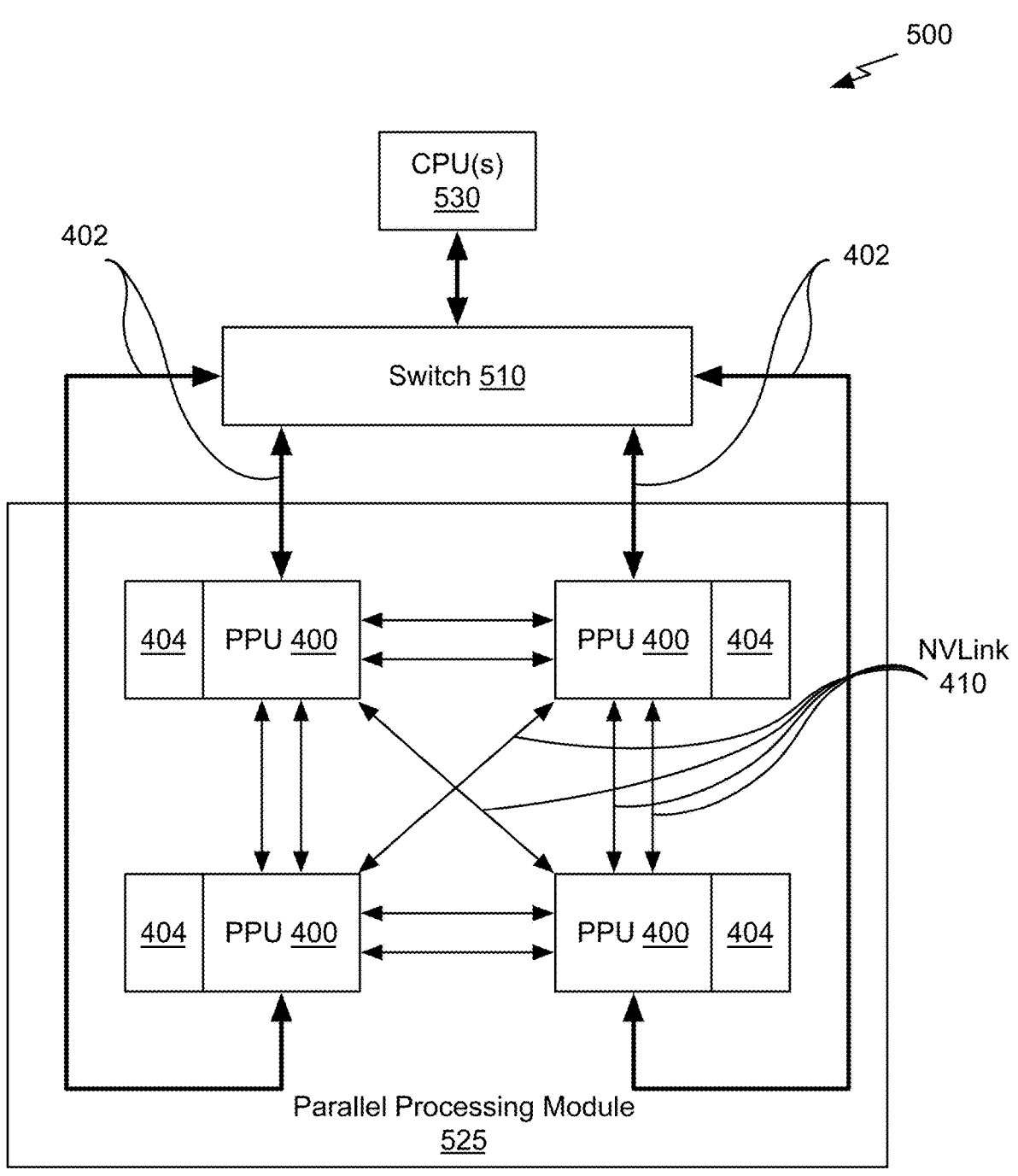
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 350 shown in FIG. 3B. The processing system 500 includes a CPU 530, switch 510, and multiple PPUs 400, and respective memories 404.

Figure 5B:
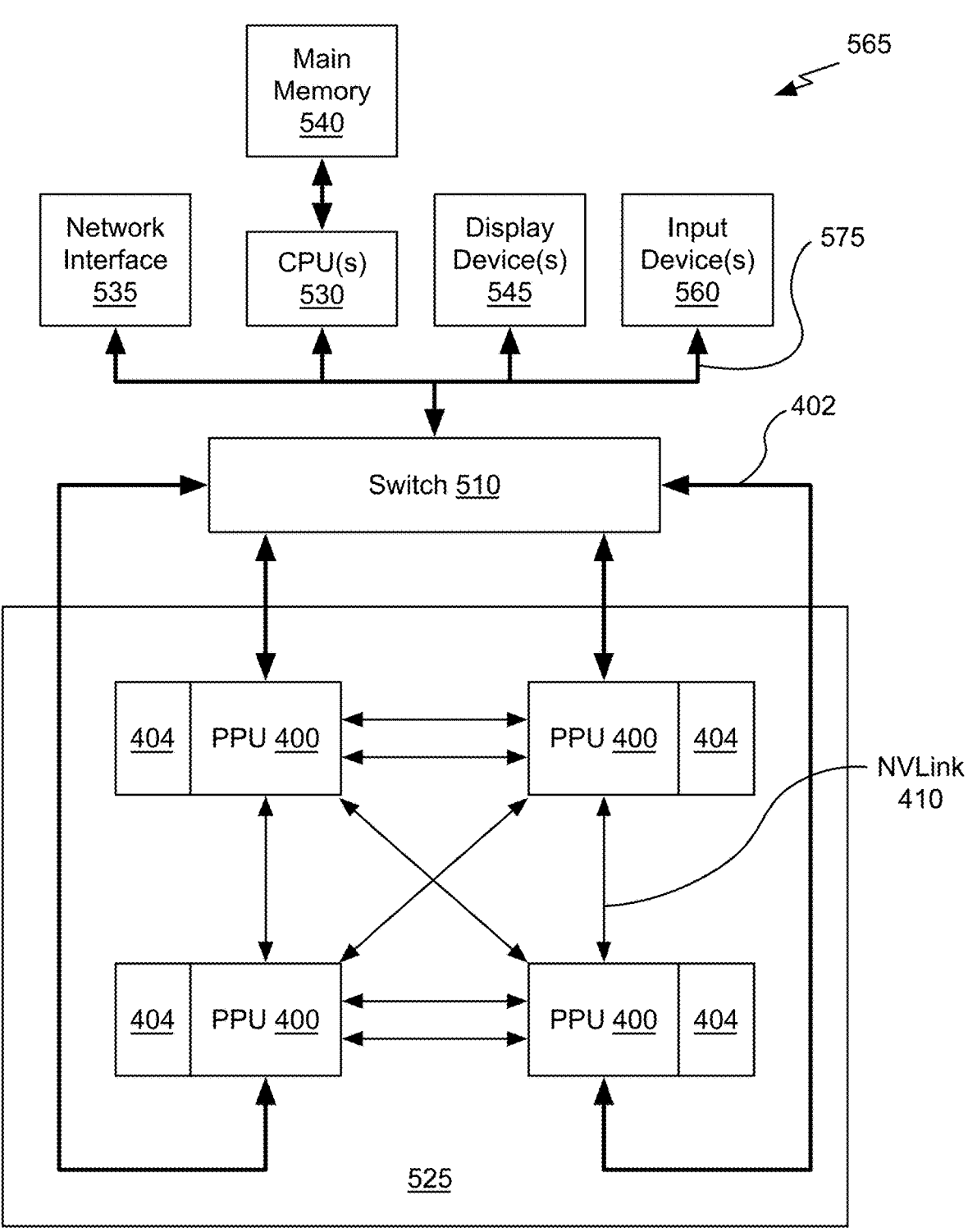
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 350 shown in FIG. 3B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
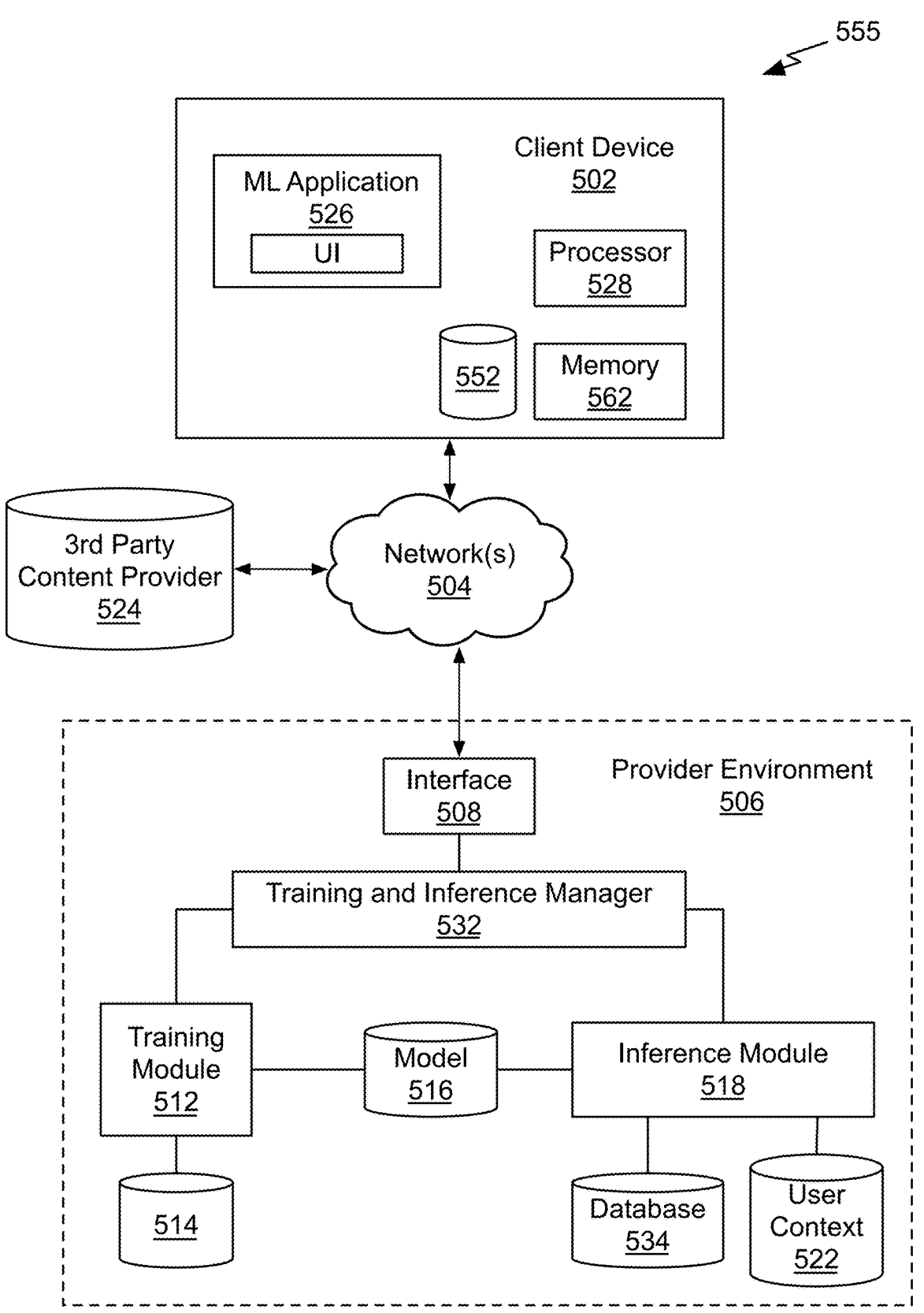
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Various programs may be executed within the PPU 400 in order to implement the various stages of the graphics processing pipeline. For example, the device driver may launch a kernel on the PPU 400 to perform a vertex shading stage on one processing unit (or multiple processing units). The device driver (or the initial kernel executed by the PPU 400) may also launch other kernels on the PPU 400 to perform other stages of the graphics processing pipeline, such as a geometry shading stage and a fragment shading stage. In addition, some of the stages of the graphics processing pipeline may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
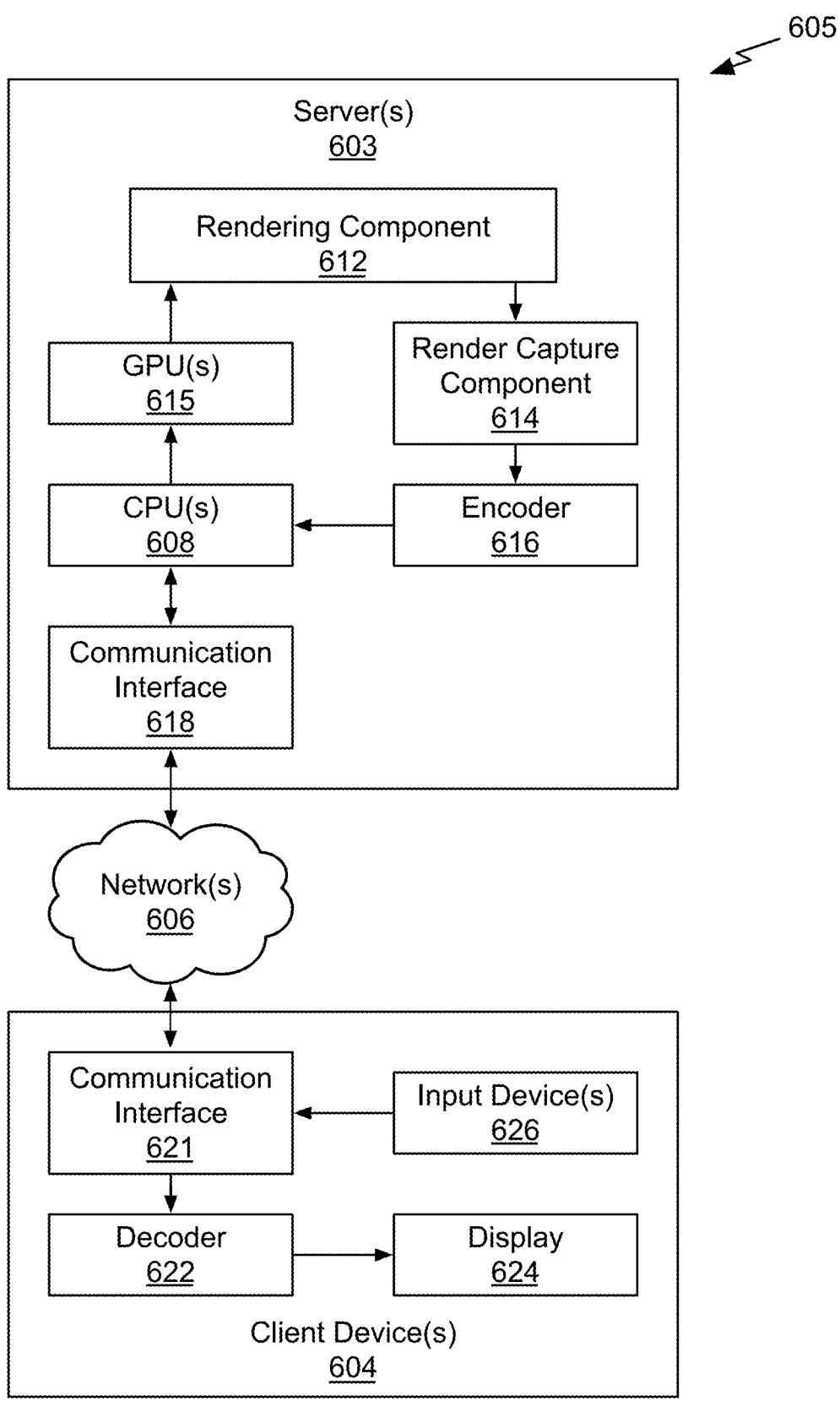
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
obtaining an image encoded in a luminance-based color space;
projecting a color of a pixel in the image, according to a transform function, to a region in the luminance-based color space to produce a projected color as a first color for the pixel, wherein the region is within a luminance polygon in the luminance-based color space and the region is constrained by the color vision deficiency; and
remapping the first color to produce a second color in a recolored version of the image, wherein the second color is constrained by a color vision deficiency (CVD).

2. The computer-implemented method of claim 1, wherein the region separates the luminance polygon into a first sub-plane and a second sub-plane, and first color samples within the first sub-plane are remapped to a first portion of the region and second color samples within the second sub-plane are remapped to a second portion of the region.

3. The computer-implemented method of claim 2, wherein a gray color point on a luminance axis separates the first portion of the region and the second portion of the region.

4. The computer-implemented method of claim 2, wherein
the projected color is remapped to a third color within a CVD gamut and,
the third color is remapped to a fourth color of the first color samples,
and further comprising interpolating between the third color and the fourth color to produce the second color for the pixel.

5. The computer-implemented method of claim 4, wherein the third color and the fourth color are interpolated based on at least one distance between the first color and the region.

6. A computer-implemented method, comprising:

obtaining an image encoded in a luminance-based color space;

projecting a color of a pixel in the image, according to a transform function, to a region within a displayable color vision deficiency (CVD) gamut in the luminance-based color space to produce a projected color as a first color for the pixel; and remapping the first color to produce a second color in a recolored version of the image, wherein the second color is constrained by a CVD.

7. A computer-implemented method, comprising;

obtaining an image encoded in a luminance-based color space;

projecting a color of a pixel in the image, according to a transform function, to a region in the luminance-based color space to produce a projected color as a first color for the pixel;

remapping the first color to produce a second color in a recolored version of the image, wherein the second color is constrained by a color vision deficiency (CVD); and for a pixel in the recolored version of the image, selecting the second color from a subset of color samples within the region that are perceived by a CVD observer as equal to the second color and is closest in value to the first color for the pixel.

8. The computer-implemented method of claim 1, further comprising:

converting an original image in a first color space to the image encoded in the luminance-based color space; and converting the recolored version of the image from the luminance-based color space to the first color space.

9. A computer-implemented method, comprising:

obtaining an image encoded in a luminance-based color space;

projecting a color of a pixel in the image, according to a transform function, to a region in the luminance-based color space to produce a projected color as a first color for the pixel; and redistributing color samples within the region to equalize a distribution of the color samples within the region, wherein the first color is remapped to produce a second color in a recolored version of the image and the second color is constrained by a color vision deficiency (CVD).

10. The computer-implemented method of claim 1, further comprising storing the second color as a texel in a texture map, wherein the second color is accessed by the first color.

11. A computer-implemented method, comprising:

obtaining an image encoded in a luminance-based color space;

projecting a color of a pixel in the image, according to a transform function, to a region in the luminance-based color space to produce a projected color as a first color for the pixel, wherein the region is a line or a plane; and remapping the first color to produce a second color in a recolored version of the image, wherein the second color is constrained by a color vision deficiency (CVD).

12. A computer-implemented method, comprising:

obtaining an image encoded in a luminance-based color space; and remapping first colors in the image to produce second colors in a recolored version of the image, wherein the second colors are constrained by a color vision deficiency (CVD), luminance values of the second colors and the respective first colors are equal, and the remapping of each one of the first colors in the image to produce the second colors is consistent with the remapping of the first colors in one or more additional images in a sequence to produce a temporally stable recolored sequence of images.

13. The computer-implemented method of claim 1, wherein at least one of the steps of obtaining, projecting, or remapping is performed on a server or in a data center to generate the recolored version of the image, and the recolored version of the image is streamed to a user device.

14. The computer-implemented method of claim 1, wherein at least one of the steps of obtaining, projecting, or remapping is performed within a cloud computing environment.

15. The computer-implemented method of claim 1, wherein at least one of the steps of obtaining, projecting, or remapping is performed for training, testing, or certifying a neural network employed in a machine, robot, or autonomous vehicle.

16. The computer-implemented method of claim 1, wherein at least one of the steps of obtaining, projecting, or remapping is performed on a virtual machine comprising a portion of a graphics processing unit.

17. A system, comprising:

a memory that stores an image encoded in a luminance-based color space; and a processor that is connected to the memory, wherein the processor is configured to:

project a color of a pixel in the image, according to a transform function, to a region in the luminance-based color space to produce a projected color as a first color for the pixel, wherein the region is within a luminance polygon in the luminance-based color space and the region is constrained by the color vision deficiency; and remap the first color to produce a second color in a recolored version of the image, wherein the second color is constrained by a color vision deficiency (CVD).

18. A non-transitory computer-readable media storing computer instructions that, when executed by one or more processors, cause the one or more processors to perform the steps of:

obtaining an image encoded in a luminance-based color space;

projecting a color of a pixel in the image, according to a transform function, to a region in the luminance-based color space to produce a projected color as a first color for the pixel, wherein the region is within a luminance polygon in the luminance-based color space and the region is constrained by the color vision deficiency; and remapping the first color to produce a second color in a recolored version of the image, wherein the second color is constrained by a color vision deficiency (CVD).

19. A system, comprising:

a memory that stores an image encoded in a luminance-based color space; and a processor that is connected to the memory, wherein the processor is configured to:

remap first colors in the image to produce second colors in a recolored version of the image, wherein the second colors are constrained by a color vision deficiency (CVD), luminance values of the second colors and the respective first colors are equal, and the remapping of each one of the first colors in the image to produce the second colors is consistent with the remapping of the first colors in one or more additional images in a sequence to produce a temporally stable recolored sequence of images.

20. A non-transitory computer-readable media storing computer instructions that, when executed by one or more processors, cause the one or more processors to perform the steps of:

obtaining an image encoded in a luminance-based color space; and remapping first colors in the image to produce second colors in a recolored version of the image, wherein the second colors are constrained by a color vision deficiency (CVD), luminance values of the second colors and the respective first colors are equal, and the remapping of each one of the first colors in the image to produce the second colors is consistent with the remapping of the first colors in one or more additional images in a sequence to produce a temporally stable recolored sequence of images.

\* \* \* \* \*